Jan. 9, 1940.  S. A. SNELL  2,186,561
VELOCIPEDE STRUCTURE
Original Filed March 22, 1937
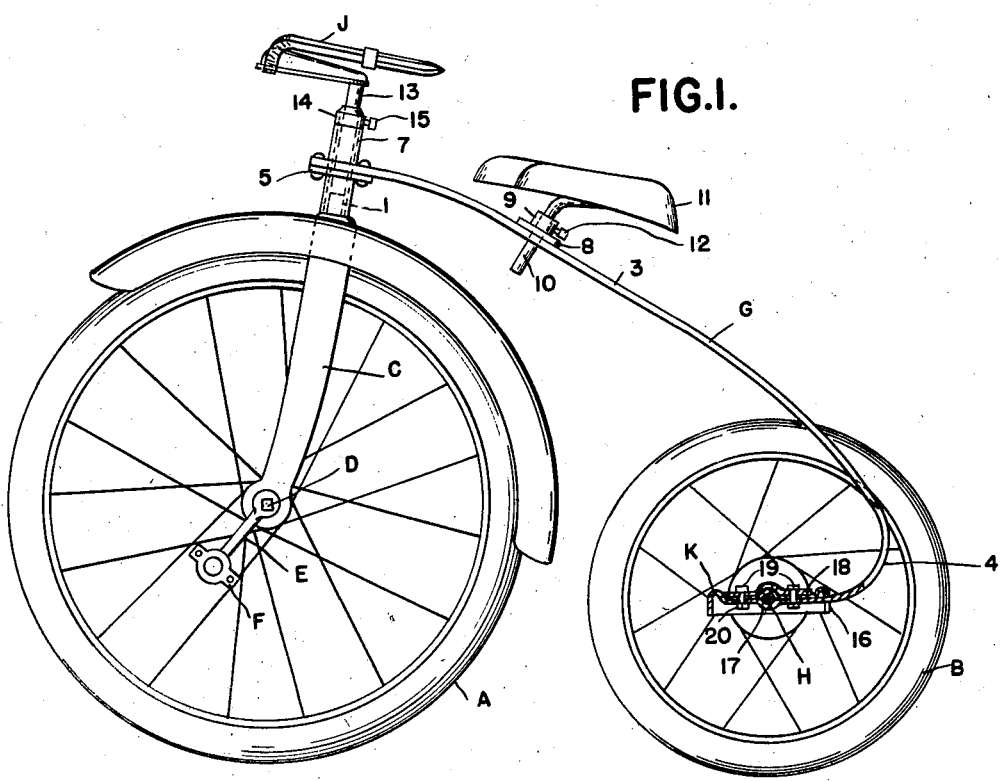
FIG.1.
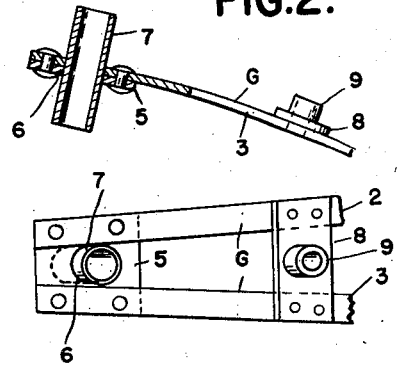
FIG.2.
FIG.3.
INVENTOR
SAMUEL A. SNELL
BY
ATTORNEYS Patented Jan. 9, 1940

2,186,561

UNITED STATES PATENT OFFICE 2,186,561

VELOCIPEDE STRUCTURE

Samuel A. Snell, Toledo, Ohio, assignor to The American-National Company, Toledo, Ohio, a corporation of Ohio Original application March 22, 1937, Serial No. 132,415. Divided and this application March 28, 1938, Serial No. 198,510

3 Claims. (Cl. 280—282)

This invention relates generally to juvenile vehicles such as velocipedes and constitutes a division of my application filed March 22, 1937, bearing Serial No. 132,415.

One of the essential objects of the invention is to provide a velocipede wherein the backbone is flexible so that it will materially improve the riding qualities and will effectively cushion the rider from shocks and jars which are ordinarily received from velocipedes of conventional design.

Another object is to improve the construction of the backbone structure so that the velocipede will not only have the desirable characteristics above referred to and be strong and durable and pleasing in appearance, but may also be manufactured at a comparatively low cost.

Other objects, advantages and novel details of construction of this invention will be made more apparent as this description proceeds, especially when considered in connection with the accompanying drawing, wherein:

Figure 1 is a fragmentary side elevation of a velocipede embodying my invention;

Figure 2 is a fragmentary side elevation of the backbone, with parts broken away and in section;

Figure 3 is a top plan view of the structure illustrated in Figure 2.

Referring now to the drawing, A is the front wheel, B designates the rear wheels, and C is the front fork straddling the front wheel and having an upwardly extending tubular shank 1. D is an axle for the front wheel journaled in the furcations of the fork C and provided at its opposite ends with cranks E and pedals F. G is the backbone comprising a pair of laterally spaced strips 2 and 3 of spring steel that extend from a point slightly in advance of the shank 1 of the front fork to an axle H for the rear wheel B. Preferably this backbone G curves slightly from the shank 1 downwardly and rearwardly and is provided at its rear end with an open return-bent portion 4. At their forward ends the strips 2 and 3 are connected to a plate 5 which has an opening 6 receiving a tube 7 forming a sleeve for the shank 1 of the front fork. In rear of the plate 5 is another plate 8 that is secured to the strips 2 and 3 and that carries a tubular bushing 9 for the supporting post 10 of a suitable seat or saddle 11. Any suitable means such as a set screw 12 threadedly engaging the bushing 9 may be used for holding the seat post 10 in adjusted position.

Preferably the shank 1 receives the depending post 13 of a suitable handlebar J. A collar 14 is sleeved upon the post 13 and shank 1 and is fastened thereto by a suitable screw 15.

The open return-bent portion 4 of the backbone extends through a depending flange 16 of a rear platform K under the latter and preferably has a substantially U-shaped portion 17 receiving the axle H for the rear wheels B. Any suitable means such as the washer or retaining plate 18 and bolts 19 and nuts 20 may be used to hold the parts together.

Thus, from the foregoing it will be apparent that I have provided a velocipede wherein the backbone structure is flexible and serves as an efficient cushion for the rider from shocks and jars, etc. Such backbone structure constitutes a part of the framework of the velocipede and cooperates with the other elements thereof to provide a strong and durable structure.

What I claim as my invention is:

1. In a velocipede, a backbone having a pair of laterally spaced bars, a front fork having an upright shank between said bars intermediate the ends thereof, a sleeve for said shank also between said bars, said sleeve being free of said bars, and a supporting plate for the sleeve sleeved upon and rigid with said sleeve and spanning the space between and rigidly secured to said bars.

2. In a velocipede, a backbone having two laterally spaced longitudinally extending frame members, a front fork having an upright shank between and free of said frame members adjacent their forward ends, a tubular member sleeved on said shank between and free of said frame members, and a rigid connection between said longitudinally extending frame members including means embracing and rigidly secured to said tubular member intermediate its ends and terminally secured to said longitudinally extending members.

3. In a velocipede, a backbone having two laterally spaced longitudinally extending frame members, a cross member extending between and terminally secured to said longitudinally extending members, said cross member being provided intermediate its ends between said longitudinally extending frame members with a substantially vertical opening, and a sleeve for an upright part of a velocipede rigidly anchored in the vertical opening in said cross member between and free of said longitudinally extending members.

SAMUEL A. SNELL.